2378X
B. L. Greenough,
Making Carriage Wheels.
Patented Sep. 12, 1815.
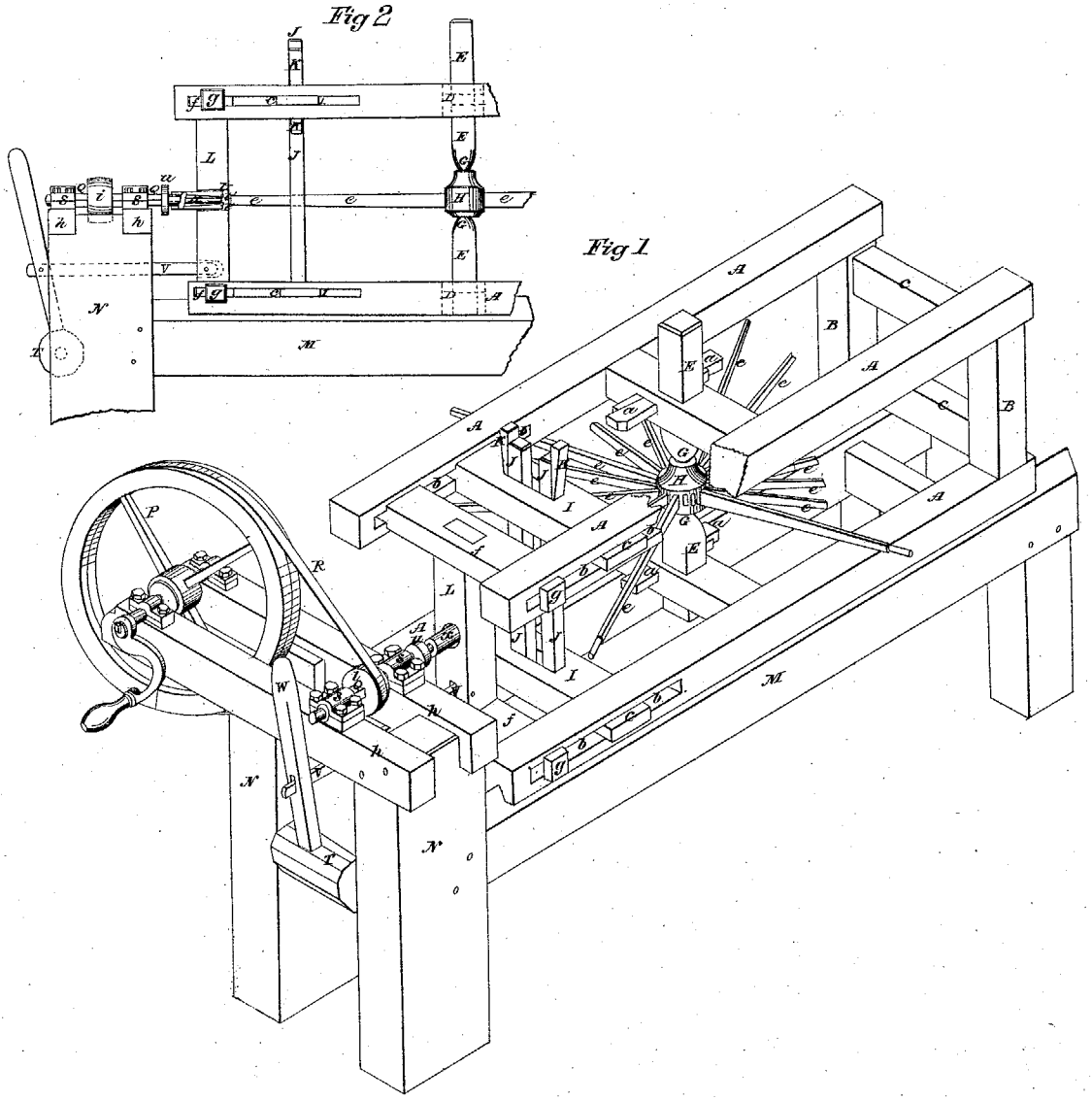
AM. PHOTO-LITHO. CO. N.Y. (OSBORNE'S PROCESS.)

Sept 12 1815
Sept. 2378X

Bracket L Greenough

Letters Patent

The Schedule referred to in these Letters Patent and making part of the same contain-
ing a description in the words of the said Bracket L Greenough himself of his -
machine for facilitating the making of Carriage Wheels The particulars of which consists in making round tenons on the exterior
ends of Waggon and other carriage wheels spokes without the assistance
of a spoke set or stroop. and bringing the shoulders of the spokes equidis-
tant from the centre of the nave and fitting them to the fellows. The
dowels and pins likewise are made with the same machine
The machine consists of a frame of suitable timber about four or five inches
square and six feet long. two feet wide and two feet high is framed to-
gether at one end by means of two posts and two girts. and in the centre of
the frame are two other girts one in the bottom and the other on the top
of the frame. one perpendicularly over the other. thro the centre of which
[illegible] girts are to be made two square mortices one perpendicularly over the
other in which are fitted two square pieces of timber each about one foot
and a half long and about three inches square and are moveable up
and down but may be secured at will by two keys that pass in contact
with them thro the girt in an opposite direction. the ends of these square
pieces of timber that point toward each other in the centre are lessened and
neatly rounded and which constitute the pivots which confine the nave
of the wheel (after the spokes are drove) while the tenons are cut
on the ends as will be herein after described
About a foot and a half or two feet nearer the head of the machine are
two other girts placed in the same direction with the pivot girts on the
ends of which tenons are made which slide into a mortice made thro
the beams so that two girts may be moved to or from the centre or pivot
girts according to the length of the spokes or standards that pass thro
them are two in fine . The standards are two pieces of timber that

[illegible] there a mortice made in the centre of the girts of an oblong square
about six inches by one and a half inch. the end of the spoke to be cut
to a tenon is placed between them and confined by two keys that are
placed in the mortice each side the standards in the top girt. That
when one spoke is cut to a tenon the standards can be hoisted up by
loosening the wedges or keys and another spoke raised between them
. At the end of the frame is the head post they post is framed in the
centre of the two girts that slide in the same mortice with the stan
dard girts and move like them except they may be confined at any
place between the standard girts and the end of the frame by four [illegible]
joint bolts that screw in the ends of the tenons and when [illegible]
it slide with the tenon along the mortice. so the distance from the
head post to the posts that confine the [illegible] may be varied accord
ing to the diameter of the wheel or the length of the spokes on which the
tenons are to be cut – The frame is calculated to slide to and from the
cutter or burr mandrill upon a carriage of a suitable height to con
venience the workmen. One end of the carriage is framed into the
posts that rise nearly as high as the centre of the sliding part of the
machine when mounted on the carriage. Into these posts and
on a right angle with the front of the machine are framed (horizontally)
two sticks of timber about four or five inches square and are placed
about a foot apart. and may be long enough on which to hang
a wheel for the purpose of turning the burr mandrill. if you
intend to operate by hand. if by water they may be no longer than
a machine is wide. Upon these and on a line with the centre of
the sliding part of the machine are placed the two blocks on which the burr
mandrill runs by means of a band that passes round a wheel on
the centre of it. When the mandrill is placed on these it runs
forward thro' the centre of the head post but is prevented from go-
ing too far by a shoulder on the mandrill back of the hollow part
that receives the tenon as fast as the shoulder is cut away by the teeth
in the end of the cylinder. The frame is moved on the carriage up
to the mandrill by means of a small piece of timber that is framed in at the foot of the head post and passes horizontally thro' directly
under the mandrill the opposite end of which is pinned thro' a lever
the end of which is pinned into a roller that turns in the posts at
the head of the machine and gives a sufficient purchase by which
the frame is easily moved up to the cutter till stop'd by the shoul
der in the head post against the shoulder on the mandrill back
of the cylinder. so that by moving the head posts you may bring
short spokes up to the burr and cut the tenons. For longer ones or
for wheels of greater diameter the head post must be moved nearer
the head of the machine. so likewise must be moved the stand
and girts to bring the standards a suitable distance from the end
of the spoke — The Burr mandrill is made of iron about
a foot and a half long. the Burr on the cutting end of it is a cyl
inder about an inch longer than the tenons intended to be cut which
the cylinder receives, about an inch of the end of the cylinder is steel
three eighths of an inch thick. being twice the thickness of the cylin
der from the cutting end to the shoulder or guide. This shoulder is
somewhat larger than the cutting end and when the head block is suit
ably placed. prevents the sliding part of the machine from moving
too near the cutter. and comes to a shoulder in the post when the
tenon is cut down. The cutting end of the cylinder has one or
more teeth that cuts away the shoulder while the tenon is recieved
into it — The dowels and pins are likewise made by presenting the
— the timber of a suitable size to the Burr.

After the spokes are set in the naves The nave is placed
upon the pivots and keyed [illegible] its place so that the end of the spoke
points directly to the Burr. a spoke is then made fast between
the standards the Burr set in motion the workman by means of the
lever draws up the machine till the tenon is cut on the end of the
end of the spoke. the machine is then thrown back by the same
means which draws the tenon out of the cylinder of the burr and
now the standards are to be removed and the operation repeated till
all are cut. If convenience may require this machine with very little obliquity may stand perpendicularly between forks in the car. The lifts of the sliding part would supply sufficient force to the man-hole and nearly the same means might be employed in raising it as in this case.

Witnesses — Brackett P. Greenough

Wm. James Wheelock
Stephen W. Kinaman

Drawing Made — 1386 words

A.O.W.